(12) United States Patent
Kitanaka et al.

(10) Patent No.: US 8,253,409 B2
(45) Date of Patent: Aug. 28, 2012

(54) RANGE DETECTION DEVICE

(75) Inventors: Tatsuya Kitanaka, Nagoya (JP); Tetsuji Kozaki, Chita-gun (JP); Hirotsugu Ishino, Toyokawa (JP); Hajime Yokoyama, Toyota (JP)

(73) Assignee: Denso Corporation, Kariya (JP)

( * ) Notice: Subject to any disclaimer, the term of this patent is extended or adjusted under 35 U.S.C. 154(b) by 267 days.

(21) Appl. No.: 12/838,783

(22) Filed: Jul. 19, 2010

(65) Prior Publication Data

US 2011/0025308 A1 Feb. 3, 2011

(30) Foreign Application Priority Data

Jul. 28, 2009 (JP) .................. 2009-175027

(51) Int. Cl.
*G01B 7/14* (2006.01)
(52) U.S. Cl. .............................. 324/207.11; 324/207.24
(58) Field of Classification Search ............. 324/207.11, 324/207.24
See application file for complete search history.

(56) References Cited

U.S. PATENT DOCUMENTS 4,022,078 A 5/1977 Malott

FOREIGN PATENT DOCUMENTS

| JP | 4-296244 | 10/1992 |
|----|----------|---------|
| JP | 7-218211 | 8/1995 |
| JP | 11-20729 | 1/1999 |
| JP | 2000-208829 | 7/2000 |
| JP | 2002-175744 | 6/2002 |
| JP | 2003-98195 | 4/2003 |
| JP | 2006-329731 | 12/2006 |
| JP | 2008-144798 | 6/2008 |
| JP | 2009-068535 | 4/2009 |

OTHER PUBLICATIONS

Mikio et al. (JP2008-144798), Range Detection Device, Partial Translation of JP2008-144798, Jul. 12, 2006.*

* cited by examiner

*Primary Examiner* — Bot Ledynh
(74) *Attorney, Agent, or Firm* — Nixon & Vanderhye PC (57) ABSTRACT

In a range detection device, a movable member has a magnetized portion and can move with a manual valve of a control device. A supporting member includes a plate portion having a surface opposed to the magnetized portion and a recess formed in an opposite surface of the plate portion, and supports the movable member such that the movable member is capable of moving parallel with the plate portion. A substrate is placed in the recess and has a first hole that penetrates the substrate. A magnetic detection element is installed to a surface of the substrate at a side of the plate portion to correspond to a position of the first hole, and detects magnetism of the magnetized portion. A sealing member is filled in the recess and covers the substrate and the magnetic detection element.

5 Claims, 6 Drawing Sheets

|    | P | P-R | R | R-N | N | N-D | D |
|----|---|-----|---|-----|---|-----|---|
| S1 | L | L   | H | H   | H | L   | L |
| S2 | H | L   | L | L   | H | H   | L |
| S3 | H | H   | H | L   | L | L   | L |

FIG. 6

RANGE DETECTION DEVICE

CROSS REFERENCE TO RELATED APPLICATION

The present application is based on Japanese Patent Application No. 2009-175027 filed on Jul. 28, 2009, the disclosure of which is incorporated herein by reference.

FIELD OF THE INVENTION

The present invention relates to a range detection device that detects a shift range of an automatic transmission.

BACKGROUND OF THE INVENTION

A range detection device that detects which range is selected in a gear position of an automatic transmission is conventionally known. In such a range detection device, a position of a movable member which moves with a member that switches the gear position of the automatic transmission is detected so that a shift range selected by a vehicle occupant is detected, for example. As a method for detecting the position of the movable member, a contact-type method for detecting the position of the movable member by contacting the movable member with a detection portion, and a noncontact-type method for detecting the position of the movable member without contacting the movable member with a detection portion are known. U.S. Pat. No. 4,022,078 discloses a noncontact-type range detection device. In the range detection device, a magnetic detection element of the detection portion detects magnetism of a magnet arranged on the movable member so that the position of the movable member is detected.

In contrast, JP-A-2009-68535 discloses a noncontact-type range detection device that is placed inside an automatic transmission in the state of oil immersion. In the range detection device, in order to prevent a magnetic detection element and a substrate, to which electronic components such as the magnetic detection element are installed, from being exposed to oil (hereinafter referred to as AT hydraulic oil), the magnetic detection element and the substrate are covered with a sealing member.

However, in manufacturing processes of the range detection device of JP-A-2009-68535, if there is a small gap between the substrate and the magnetic detection element, the gap is not filled with the sealing member, and the sealing member may be hardened with air bubbles existing between the substrate and the magnetic detection element. In the case where air bubbles exist between the substrate and the magnetic detection element, if a temperature of an installation environment of the range detection device is increased, the air bubbles expand and stress is applied to the magnetic detection element, and thereby a magnetic detection property of the magnetic detection element may change. Moreover, if the air bubbles between the substrate and the magnetic detection element expand too much, stress may concentrate at a solder connection portion between the substrate and the magnetic detection element and the solder connection portion may be destroyed. Further, a position of the magnetic detection element with respect to the substrate may change. In this manner, if the property and the position of the magnetic detection element change, detection accuracy of the position of the movable member by the magnetic detection element, that is, detection accuracy of the range of the automatic transmission may be decreased.

By performing degassing treatment such as vacuuming before the sealing member is hardened, the air bubbles between the substrate and the magnetic detection element can be removed to some extent. However, it is difficult to remove the air bubbles thoroughly. Moreover, if such degassing treatment is performed, cost of equipment may be increased and the manufacturing processes may become complicated, thereby increasing manufacturing cost.

SUMMARY OF THE INVENTION

In view of the above-described problems, it is an object of the present invention to provide a range detection device which can be easily manufactured and maintain predetermined range detection accuracy regardless of a temperature change of an installation environment.

According to one aspect of the present invention, a range detection device attached to a control device that changes a gear position of an automatic transmission by a switching portion and configured to detect which range is selected in the gear position, includes: a movable member including a magnetic generating portion, the movable member being capable of moving with the switching portion; a supporting member including a plate portion having a surface that is opposed to the magnetic generating portion of the movable member, and a recess formed in a surface of the plate portion which is opposite from the movable member, the supporting member supporting the movable member such that the movable member is capable of moving parallel with the plate portion; a substrate placed in the recess substantially parallel with the plate portion and having a first hole that communicates between a first surface of the substrate at a side of the plate portion and a second surface of the substrate at an opposite side of the plate portion; a magnetic detection element installed to the first surface of the substrate so as to correspond to a position of the first hole, the magnetic detection element being capable of detecting magnetism of the magnetic generating portion; and a sealing member filled in the recess and covering the substrate and the magnetic detection element.

Accordingly, the range detection device detects a position of the movable member with respect to the supporting member based on intensity or the like of the magnetism, which is detected by the magnetic detection element, so that a position of the switching portion with respect to the position of the movable member, that is, a shift range of the automatic transmission can be detected.

In the present invention, the sealing member is filled in the recess of the supporting member, and covers the substrate and the magnetic detection element. Thus, for example, even when the range detection device is placed inside the automatic transmission in the state of oil immersion, the substrate and the magnetic detection element can be prevented from being exposed to the AT hydraulic oil.

As described above, in the present invention, the substrate has the first hole, and the magnetic detection element is installed to the substrate such that the magnetic detection element is located so as to correspond to the position of the first hole. Thus, in manufacturing processes of the range detection device, even if there is a space in which the sealing member is not filled, that is, air bubbles exist between the substrate and the magnetic detection element when filling the sealing member, the air bubbles can be released outside the sealing member through the first hole. Therefore, in the range detection device after the manufacturing processes, the space between the substrate and the magnetic detection element, that is, the space around the magnetic detection element at a side of the substrate can be filled with the sealing member. As a result, even if a temperature of an installation environment of the range detection device is increased, application of stress to the magnetic detection element and a change of a position of the magnetic detection element with respect to the substrate can be limited compared with the case where air bubbles exist between the substrate and the magnetic detection element. Therefore, the range detection device of the present invention can maintain predetermined range detection accuracy regardless of a temperature change of the installation environment.

As described above, according to the present invention, since a process for removing the air bubbles between the substrate and the magnetic detection element (i.e., degassing treatment) is not needed, the range detection device can be manufactured easily. Furthermore, in the present invention, stress concentration at a solder connection portion between the substrate and the magnetic detection element can be limited, and thereby reliability can be improved in a soldered connection.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Hereinafter, embodiments of the present invention will be described with reference to drawings. In the following embodiments, similar components are indicated by the same reference numeral, and the description thereof will not be repeated.

(First Embodiment)

Figure 1A:
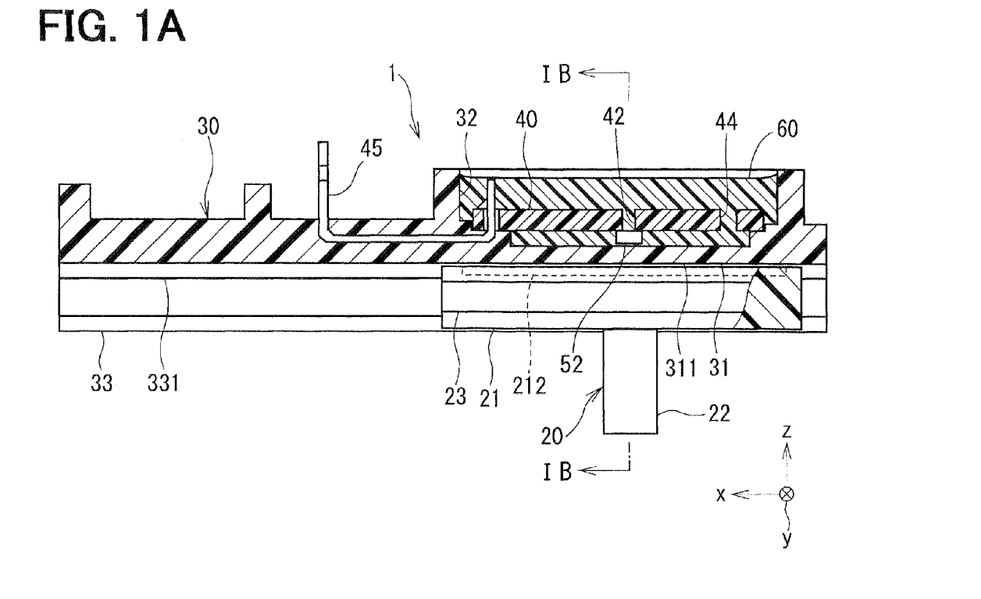
FIG. 1A is a cross-sectional view showing a range detection device according to a first embodiment of the present invention, taken along the line IA-IA of FIG. 1B.
Figure 1B:
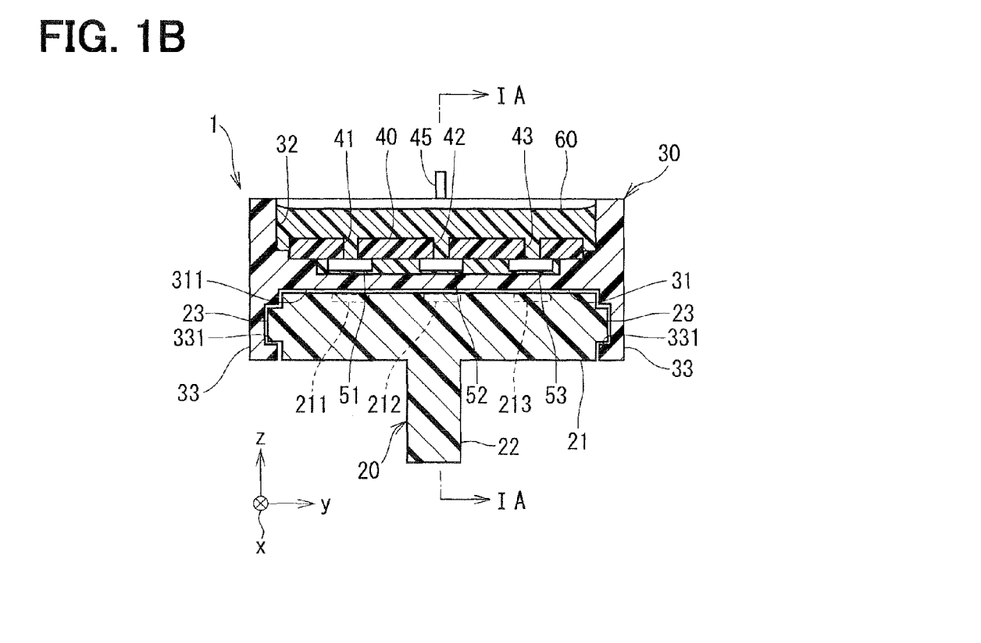
FIG. 1B is a cross-sectional view showing the range detection device according to the first embodiment of the present invention, taken along the line IB-IB of FIG. 1A.
Figure 2:
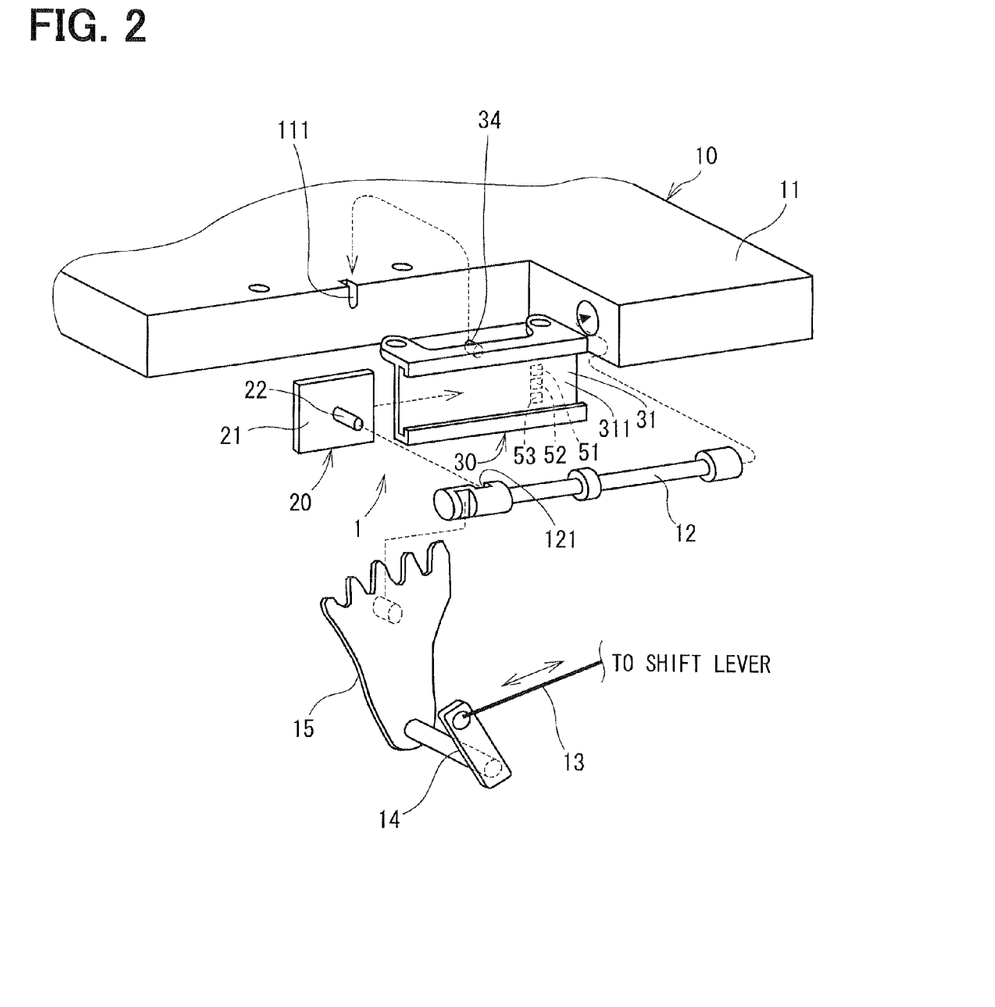
FIG. 2 is an exploded perspective view showing the attachment of the range detection device according to the first embodiment of the present invention to a hydraulic control device.

A range detection device of the first embodiment of the present invention is shown in FIGS. 1A to 2.

As shown in FIG. 2, a range detection device 1 is attached to a case 11 of a hydraulic control device 10 as a control device. The hydraulic control device 10 has a hydraulic switching valve (hereinafter referred to as manual valve) 12 as a switching portion. When a vehicle occupant selects a shift range (i.e., gear position) and operates a shift lever (not shown), operational force to the shift lever is transmitted to the manual valve 12 of the hydraulic control device 10 via a cable 13, a linkage mechanism 14 and a detent lever 15. The manual valve 12 reciprocates in the case 11 by the operational force so that an oil passage in the hydraulic control device 10 is changed. Accordingly, supply of line-pressure hydraulic oil to multiple friction elements such as a clutch or a brake (not shown) of an automatic transmission is controlled, and the friction elements are engaged to be the selected shift range. As a result, the gear position of the automatic transmission is changed to the shift range selected by the vehicle occupant.

Regarding the above-described hydraulic control device 10 and the operation of the automatic transmission, the range detection device 1 is configured to detect which range is selected in the shift range of the automatic transmission. The range detection device 1 is placed in an oil pan (not shown) of the automatic transmission. That is, the range detection device 1 is placed inside the automatic transmission in the state of oil immersion.

As shown in FIGS. 1A and 1B, the range detection device 1 includes a movable member 20, a supporting member 30, a substrate 40, magnetic detection elements 51, 52, 53, a sealing member 60 and the like.

The movable member 20 is made of, for example, plastic magnet material, that is, mixed material of resin and magnetic material. The movable member 20 includes a plate-like flat plate portion 21 and an engagement pin 22 that projects from one surface of the flat plate portion 21. A surface of the flat plate portion 21 which is opposite from the surface, on which the engagement pin 22 is placed, is partially magnetized. In the present embodiment, as shown in FIG. 1B, three portions in the surface of the flat plate portion 21 are magnetized. Hereinafter, the three portions which are magnetized are referred to as magnetized portions 211, 212, 213, respectively. Each of the magnetized portions 211 to 213 corresponds to a magnetic generating portion in claims. In addition, a magnetized pattern of each of the magnetized portions 211 to 213 will hereinafter be described in detail.

The engagement pin 22 is capable of engaging with an engagement portion 121 of the manual valve 12 of the hydraulic control device 10 (refer to FIG. 2). Thus, when the manual valve 12 reciprocates in the case 11, the movable member 20 can move in conjunction with the reciprocating movement of the manual valve 12.

The supporting member 30 is attached to the case 11 of the hydraulic control device 10. In particular, the supporting member 30 is fixed to the case 11 with a bolt or the like (not shown). A positioning pin 34 of the supporting member 30 is engaged with a positioning trench 111 of the case 11 so that the supporting member 30 can be easily positioned with respect to the case 11 and fixed to the case 11 (refer to FIG. 2).

The supporting member 30 is made of resin, for example, and includes a plate portion 31 and a recess 32 as shown in FIGS. 1A and 1B. The plate portion 31 has a surface 311 that is opposed to the magnetized portions 211 to 213 of the movable member 20. The recess 32 is formed in a surface of the plate portion 31 which is opposite from the surface 311.

The plate portion 31 has two rail portions 33 which project from the surface 311. Each of the two rail portions 33 is formed along an end edge portion of the plate portion 31. The two rail portions 33 have respectively rail trenches 331 in surfaces thereof, which are opposed to each other. The rail trenches 331 extend parallel with the surface 311. The flat plate portion 21 of the movable member 20 has protrusions 23 on both side surfaces thereof. The protrusions 23 correspond to the rail trenches 331, respectively. The two protrusions 23 are slidably fitted in the rail trenches 331 of the supporting member 30, respectively, and thereby the movable member 20 can reciprocate in a state where the movable member 20 is parallel with the surface 311 of the plate portion 31. That is, the supporting member 30 supports the movable member 20 such that the movable member 20 is capable of moving parallel with the plate portion 31. Hereinafter, a direction of the reciprocating movement of the movable member 20 will be referred to as an x-direction (refer to FIG. 1A). A direction that is perpendicular to the x-direction and is parallel with the surface 311 will be referred to as a y-direction (refer to FIG. 1B).

The substrate 40 is placed in the recess 32 so as to be substantially parallel with the plate portion 31 of the supporting member 30. That is, the substrate 40 does not need to be strictly parallel with the plate portion 31. The substrate 40 has first holes 41, 42, 43 that communicate between a surface of the substrate 40 at a side of the plate portion 31 (hereinafter referred to as a first surface of the substrate 40) and a surface of the substrate 40 at an opposite side of the plate portion 31 (hereinafter referred to as a second surface of the substrate 40). In the present embodiment, as shown in FIG. 1B, the first holes 41 to 43 are formed in the substrate 40 with predetermined intervals in the y-direction. Furthermore, the substrate 40 has a second hole 44 that communicates between the first surface of the substrate 40 and the second surface of the substrate 40 in a position different from the positions where the first holes 41 to 43 are formed (refer to FIG. 1A).

The magnetic detection elements 51 to 53 are installed to the first surface of the substrate 40 so as to correspond to the first holes 41 to 43, respectively. That is, the center of each of the magnetic detection elements 51 to 53 overlaps with the center of each of the first holes 41 to 43.

Each of the magnetic detection elements 51 to 53 is an element that can detect magnetism around it, i.e., a hall element such as a hall IC or a magnetoresistance effect element such as MRE or GMR. The magnetic detection elements 51 to 53 are soldered to the substrate 40 by SMT (Surface Mount Technology), for example.

The magnetic detection elements 51 to 53 are installed to the substrate 40 such that each of the magnetic detection elements 51 to 53 is located on the position corresponding to the position in which each of the magnetized portions 211 to 213 of the movable member 20 is formed while being placed in the recess 32 (refer to FIG. 1B).

Moreover, a terminal 45 is inserted in and installed to the substrate 40. The terminal 45 is inserted into the substrate 40 from the side of the plate portion 31 and is soldered to the substrate 40 at the opposite side of the plate portion 31.

Figure 3:
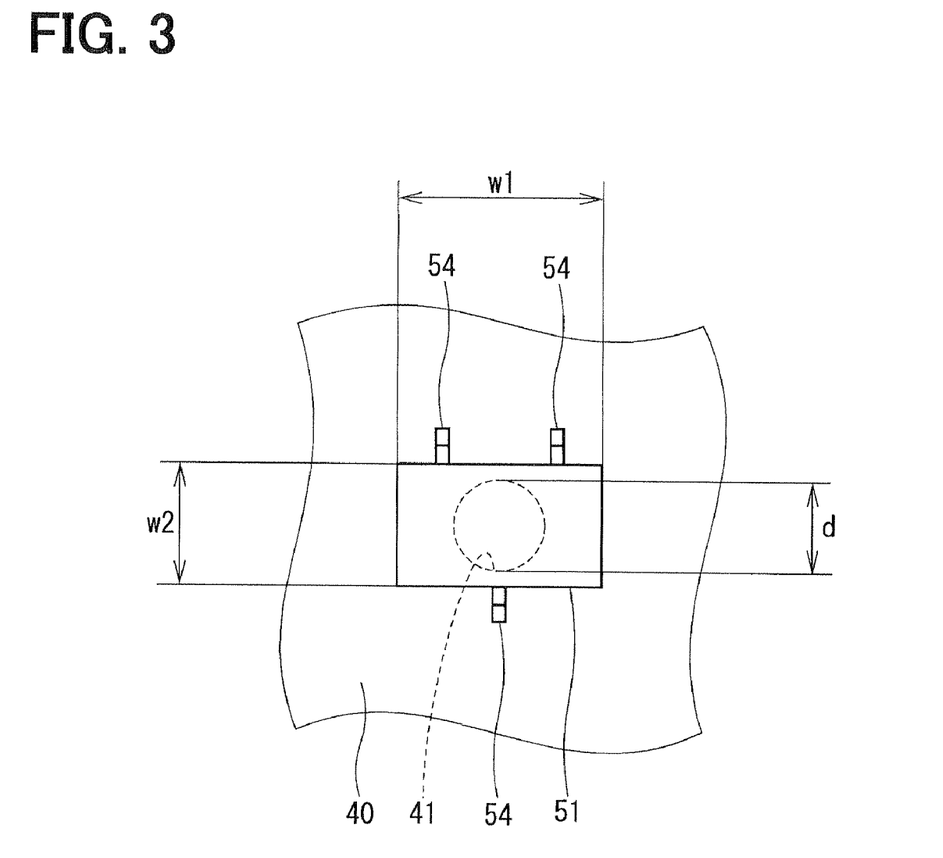
FIG. 3 is a schematic view showing a positional relation between a first hole in a substrate and a magnetic detection element in the range detection device according to the first embodiment of the present invention.

FIG. 3 shows the first hole 41 of the three first holes, and the magnetic detection element 51 that is installed to the substrate 40 so as to correspond to the position of the first hole 41. As shown in FIG. 3, the first hole 41 is formed such that an opening portion thereof in the first surface of the substrate 40 at a side of the magnetic detection element 51 has a substantially circular shape. That is, the first hole 41 is formed to have a cylindrical shape, for example. A diameter of the opening portion of the first hole 41, a width of the magnetic detection element 51 in a longitudinal direction, and a width of the magnetic detection element 51 in a lateral direction are indicated by d, w1, and w2, respectively. In the present embodiment, d is set to be smaller than w2. More specifically, d is set to be 0.7 mm to 1.7 mm. The upper limit of d, i.e., 1.7 mm, is a value set in consideration of a width of a general magnetic detection element. This is because it may become difficult for the magnetic detection element 51 to be installed to the substrate 40 if d is larger than the width w2 of the magnetic detection element 51. In contrast, the lower limit of d, i.e., 0.7 mm, is a value set in consideration of flow performance of the sealing member 60 described below and air bubbles in the first hole 41. In the present embodiment, the first holes 42, 43 are set to have the same shape and size with the first hole 41.

Moreover, as shown in FIG. 3, in the present embodiment, the magnetic detection element 51 has three terminals 54, and each of the terminals 54 is soldered to the substrate 40. Similarly, the magnetic detection elements 52, 53 have three terminals 54, respectively. The terminals 54 of the magnetic detection elements 52, 53 are soldered to the substrate 40.

As shown in FIGS. 1A and 1B, the sealing member 60 is filled in the recess 32 of the supporting member 30. The sealing member 60 covers the substrate 40 and the magnetic detection elements 51 to 53. Thus, even when the range detection device 1 is placed in the automatic transmission in the state of oil immersion as in the present embodiment, the substrate 40 and the magnetic detection elements 51 to 53 can be prevented from being exposed to AT hydraulic oil. Therefore, in the present embodiment, corrosion of the substrate 40 and the magnetic detection elements 51 to 53 due to the AT hydraulic oil and a short circuit of wirings on the substrate 40 due to a contamination such as metal powder in the AT hydraulic oil can be limited.

The sealing member 60 is made of resin such as epoxy resin. The sealing member 60 is in a liquid state when filling into the recess 32, and is hardened with time. In the present embodiment, the sealing member 60 is colored a dark color such as black.

Next, processes for filling the sealing member 60 into the recess 32 of the supporting member 30 among the manufacturing processes of the range detection device 1 are described with reference to FIGS. 4A to 4C.

In the range detection device 1 of the present embodiment, the sealing member 60 is filled in the recess 32 by the following processes.

Figure 4A:
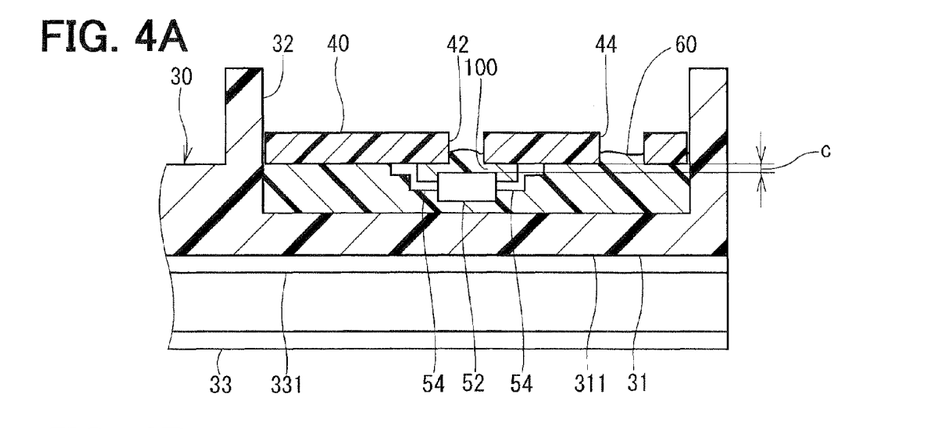
FIGS. 4A to 4C are schematic views showing a part of manufacturing processes of the range detection device according to the first embodiment of the present invention.

The sealing member 60 is filled into the recess 32 of the supporting member 30 at a side of the magnetic detection element 52 (the magnetic detection elements 51, 53) from the substrate 40 through the second hole 44 (refer to FIG. 4A). The process is referred to as a first filling process.

After the first filling process, the filling of the sealing member 60 is further continued so that the sealing member 60 flows out from the first hole 42 (the first holes 41, 43) to an opposite side of the magnetic detection element 52 (the magnetic detection elements 51, 53) from the substrate 40 in the recess 32. The flowing of the sealing member 60 out from the first hole 42 is checked (refer to FIG. 4B). The process is referred to as a checking process.

Figure 4B:
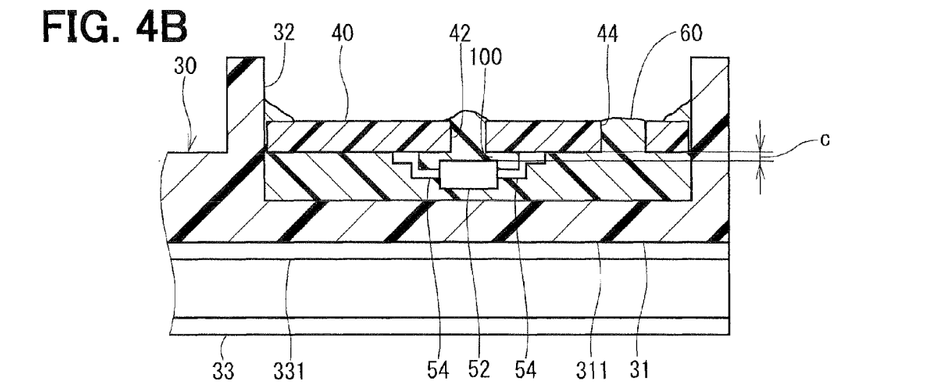
Figure 4C:
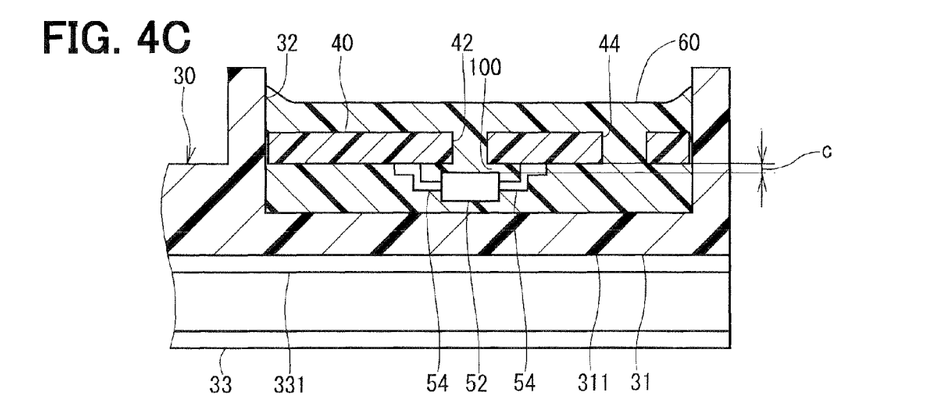

After the checking process, the sealing member 60 is filled in the recess 32 at the opposite side of the magnetic detection element 52 (the magnetic detection elements 51, 53) from the substrate 40 (refer to FIG. 4C). The process is referred to as a second filling process.

In the present embodiment, as shown in FIGS. 4A to 4C, the magnetic detection element 52 (the magnetic detection elements 51, 53) is installed to the substrate 40 with a gap 100 of a predetermined width c from the substrate 40. That is, the gap 100 is formed between the substrate 40 and the magnetic detection element 52 (the magnetic detection elements 51, 53). The width c of the gap 100 can be set arbitrarily by adjusting the length of the terminal 54 of the magnetic detection element 52 (the magnetic detection elements 51, 53) to the substrate 40. By forming the gap 100 of the predetermined width c between the magnetic detection element 52 (the magnetic detection elements 51, 53) and the substrate 40, the sealing member 60 can easily flow into the first hole 42 (the first holes 41, 43) through the gap 100 in the first filling process and the checking process. Thus, a space around the magnetic detection elements 51 to 53 at a side of the substrate 40, that is, a space between the magnetic detection elements 51 to 53 and the substrate 40 can be reliably filled with the sealing member 60. Therefore, in the range detection device 1 after the manufacturing processes, air bubbles do not exist between the substrate 40 and the magnetic detection elements 51 to 53.

Next, the magnetized pattern of each of the magnetized portions 211 to 213 and the detection of the shift range by the range detection device 1 will be described with reference to FIGS. 5A to 5C.

Figure 5A:
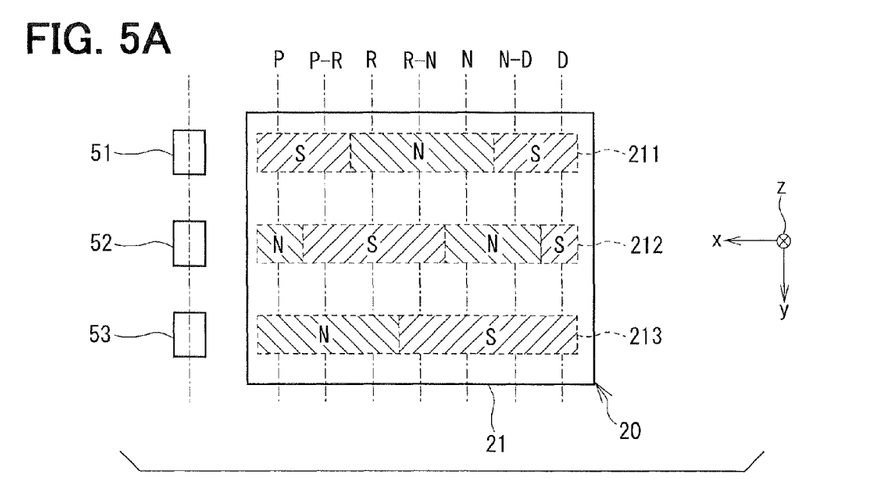
FIGS. 5A to 5C are views for explaining range detection of the range detection device according to the first embodiment of the present invention, and showing a positional relation between a magnetic generating portion and a magnetic detection element, a magnetic change around the magnetic detection element, and a change of an output signal from the magnetic detection element, respectively.

FIG. 5A shows the flat plate portion 21 of the movable member 20 and the magnetic detection elements 51 to 53 viewed from a z-direction shown in FIG. 1A. The z-direction is a direction perpendicular to both the x-direction and the y-direction. In FIG. 5A, the supporting member 30 and the like are not shown for clarification, and only the flat plate portion 21 of the movable member 20 and the magnetic detection elements 51 to 53 are shown.

As shown in FIG. 5A, the three portions in the surface of the flat plate portion 21 at a side of the magnetic detection elements 51 to 53 are magnetized. The magnetized three portions correspond to the magnetized portions 211 to 213, respectively. The magnetized portions 211 to 213 are formed to be elongated in the x-direction, respectively, and are magnetized in the flat plate portion 21 such that a north pole and a south pole are alternately arranged in the x-direction.

As described above, the magnetic detection elements 51 to 53 are installed to the substrate 40 such that each of the magnetic detection elements 51 to 53 is located on the position corresponding to the position of each of the magnetized portions 211 to 213. Thus, the magnetic detection elements 51 to 53 can detect the magnetism of the magnetized portions 211 to 213, respectively.

For example, when the movable member 20 moves in the x-direction from the position shown in FIG. 5A so that the magnetized portions 211 to 213 at positions shown by the dashed line P are respectively located over the magnetic detection elements 51 to 53, the magnetic detection element 51 detects south pole magnetism, the magnetic detection element 52 detects north pole magnetism, and the magnetic detection element 53 detects north pole magnetism.

Figure 5B:
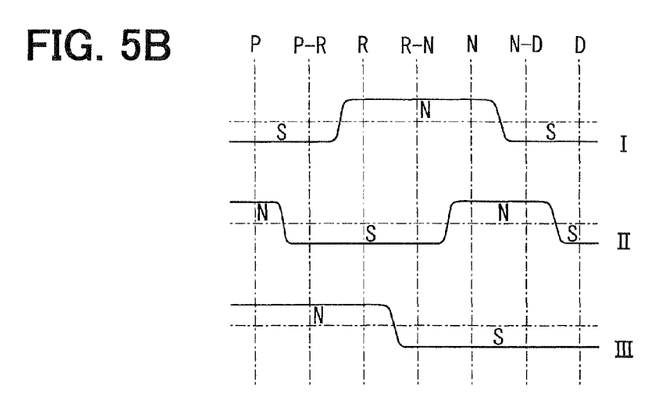
Figure 5C:
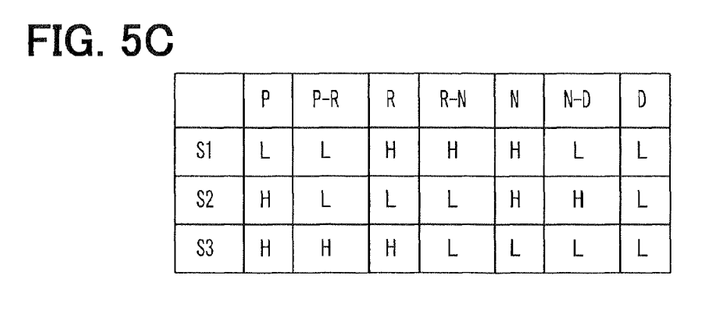

The magnetic change around each of the magnetic detection elements 51 to 53 is shown by each of the solid lines I, II, III in FIG. 5B. As the movable member 20 moves in the x-direction from the position shown in FIG. 5A, the magnetism around each of the magnetic detection elements 51 to 53 changes as shown in FIG. 5B.

Each of the magnetic detection elements 51 to 53 outputs a high-level (H) signal when detecting the north pole magnetism, and outputs a low-level (L) signal when detecting the south pole magnetism. S1, S2 and S3 in FIG. 5C denote the signals which are output by the magnetic detection elements 51, 52 and 53, respectively. As the movable member 20 moves in the x-direction from the position shown in FIG. 5A, the output signals S1 to S3 from the magnetic detection elements 51 to 53 change as shown in FIG. 5C.

In this manner, the kinds of output signals S1 to S3 (H or L) from the magnetic detection elements 51 to 53 vary with the position of the movable member 20. Thus, the range detection device 1 can detect the position of the manual valve 12 in the hydraulic control device 10 based on the combination of the output signals S1 to S3. Therefore, the range detection device 1 can detect which range (P, R, N, D) is selected in the shift range of the automatic transmission or to which range the shift range of the automatic transmission is switched (P-R, R-N, N-D).

As described above, in the present embodiment, the substrate 40 has the first holes 41 to 43, and the magnetic detection elements 51 to 53 are installed to the substrate 40 such that each of the magnetic detection elements 51 to 53 is located on the position corresponding to the position of each of the first holes 41 to 43. Thus, in the manufacturing processes of the range detection device 1, even if there is a space in which the sealing member 60 is not filled, that is, air bubbles exist between the substrate 40 and the magnetic detection elements 51 to 53 when filling the sealing member 60, the air bubbles can be released outside the sealing member 60 through the first holes 41 to 43. Therefore, in the range detection device 1 after the manufacturing processes, the space between the substrate 40 and the magnetic detection elements 51 to 53, that is, the space around the magnetic detection elements 51 to 53 at the side of the substrate 40 can be filled with the sealing member 60. As a result, even if a temperature of an installation environment of the range detection device 1 is increased, application of stress to the magnetic detection elements 51 to 53 and a change of the position of the magnetic detection elements 51 to 53 with respect to the substrate 40 can be limited compared with the case where air bubbles exist between the substrate 40 and the magnetic detection elements 51 to 53. Therefore, the range detection device 1 of the present embodiment can maintain predetermined range detection accuracy regardless of a temperature change of the installation environment. Furthermore, in the present embodiment, stress concentration at the solder connection portion between the substrate 40 and the magnetic detection elements 51 to 53 can be limited, and thereby reliability can be improved in the soldered connection.

Moreover, in the present embodiment, the substrate 40 has the second hole 44 in the position different from the positions where the first holes 41 to 43 are formed. According to the configuration, the range detection device of the present embodiment can be manufactured by the manufacturing processes including the first filling process, the checking process and the second filling process. In the present embodiment, the sealing member 60 flows out from the first holes 41 to 43 to the opposite side of the magnetic detection elements 51 to 53 from the substrate 40 in the recess 32, and the flowing of the sealing member 60 out from the first holes 41 to 43 can be checked in the checking process. Thus, filling of the space between the substrate 40 and the magnetic detection elements 51 to 53 with the sealing member 60 can be checked reliably. Thus, a process for removing the air bubbles between the substrate 40 and the magnetic detection elements 51 to 53 becomes unnecessary. Therefore, the range detection device of the present embodiment can be easily manufactured, and manufacturing cost of the range detection device can be reduced since a device for degassing treatment is unnecessary.

In the present embodiment, the magnetic detection elements 51 to 53 are installed to the substrate 40 with the gap 100 of the predetermined width c from the substrate 40. By forming the gap intentionally between the substrate 40 and the magnetic detection elements 51 to 53, the sealing member 60 can easily flow into the first holes 41 to 43 through the gap 100 when filling the sealing member 60. Thus, the space around the magnetic detection elements 51 to 53 at the side of the substrate 40 can be reliably filled with the sealing member 60.

Moreover, in the present embodiment, each of the first holes 41 to 43 is formed such that the opening portion thereof has the substantially circular shape. The diameter d of the opening portion of each of the first holes 41 to 43 is set to be 0.7 mm to 1.7 mm. According to the configuration, in the present embodiment, it can become easy for the magnetic detection elements 51 to 53 to be installed to the substrate 40, and the flow performance of the sealing member 60 and the air bubbles in the first holes 41 to 43 can be secured.

(Second Embodiment)

Figure 6:
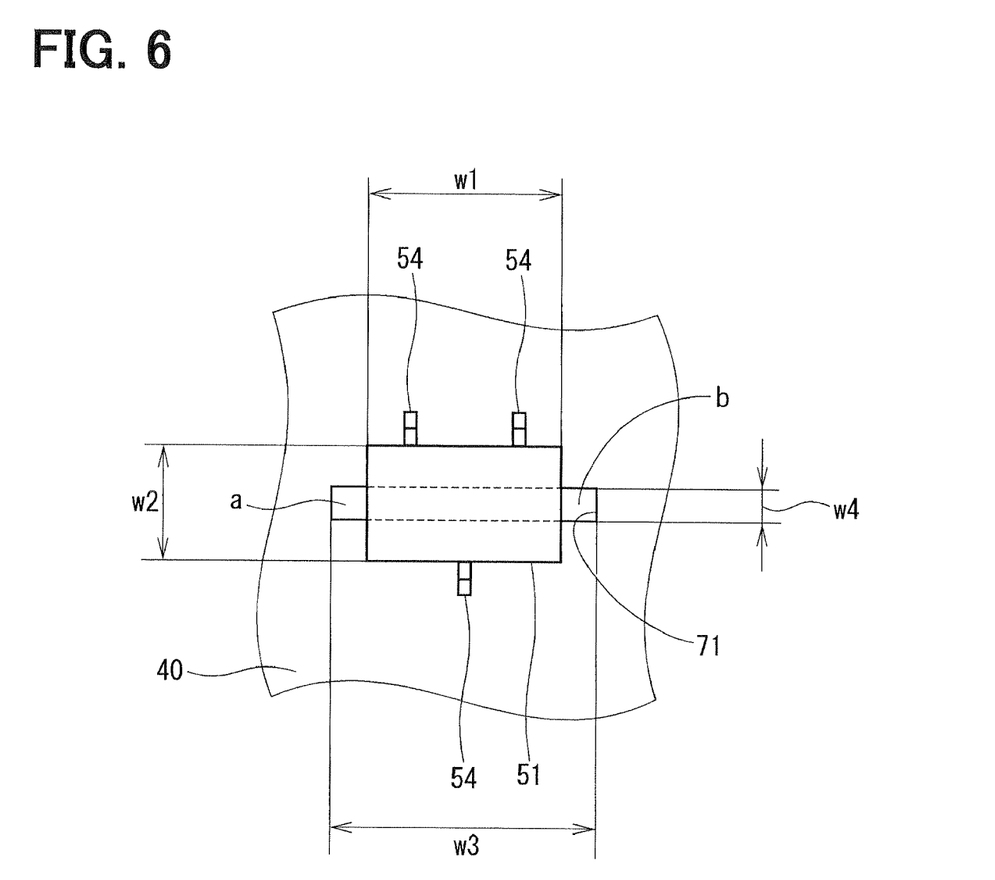
FIG. 6 is a schematic view showing a positional relation between a first hole in a substrate and a magnetic detection element in a range detection device according to a second embodiment of the present invention.

A part of a range detection device of the second embodiment of the present invention is shown in FIG. 6. In the second embodiment, the shape of the first hole differs from that of the first embodiment.

FIG. 6 shows a first hole 71 of three first holes formed in the substrate 40, and the magnetic detection element 51 that is installed to the substrate 40 so as to correspond to the position of the first hole 71. As shown in FIG. 6, the first hole 71 is formed such that an opening portion thereof in the first surface of the substrate 40 at a side of the magnetic detection element 51 has a substantially rectangular shape. That is, the first hole 71 is formed to have a slit-like shape (quadrangular prism shape), for example. A width w3 of the opening portion of the first hole 71 in a longitudinal direction is set to be larger than the width w1 of the magnetic detection element 51 in the longitudinal direction. Thus, if the magnetic detection element 51 is installed to the substrate 40, a portion which is not covered by the magnetic detection element 51 (portions denoted by a and b in FIG. 6) is formed in the opening portion of the first hole 71. Therefore, even if the substrate 40 and the magnetic detection element 51 closely contact to each other and have no gap therebetween, the sealing member 60 can flow to the first hole 71 through a part of the opening portion (the portions a and b) of the first hole 71 when filling the sealing member 60. Thus, a space around the magnetic detection element 51 at a side of the substrate 40 can be reliably filled with the sealing member 60.

Since a width w4 of the opening portion of the first hole 71 in a lateral direction is set to be smaller than the width w2 of the magnetic detection element 51 in the lateral direction, it does not become difficult for the magnetic detection element 51 to be installed to the substrate 40.

In the present embodiment, two first holes having the similar shape to the first hole 71 are formed in the substrate 40 other than the first hole 71. The magnetic detection elements 52, 53 (not shown in FIG. 6) are installed to the substrate 40 so as to correspond to the two first holes, respectively.

In addition, in the present embodiment, the magnetic detection element 51 (the magnetic detection elements 52, 53) may be installed to the substrate 40 without a gap of a predetermined width from the substrate 40. That is, the magnetic detection element 51 (the magnetic detection elements 52, 53) may be installed to the substrate 40 so as to closely contact the substrate 40. This is because, in the present embodiment, the sealing member 60 can flow to the first hole 71 through the part of the opening portion (the portions a and b) of the first hole 71 when filling the sealing member 60, even if the substrate 40 and the magnetic detection element 51 (the magnetic detection elements 52, 53) have no gap therebetween.

(Other Embodiments)

In the above embodiments, the three first holes are formed in the substrate and the three magnetic detection elements are installed to the substrate. In contrast, in other embodiments of the present invention, as long as the number of the first holes is the same with that of the magnetic detection elements, the number of the first holes and that of the magnetic detection elements may be one, two, or four or more. Moreover, the number of the second holes is not limited to one. Multiple second holes may be formed.

In the above embodiments, the shape of the opening portion of the first hole in the substrate is the circular shape or the rectangular shape. In contrast, in other embodiments of the present invention, the shape of the opening portion of the first hole may be an elliptical shape or a polygonal shape other than the rectangular shape.

Moreover, in the above embodiments, the method for detecting a position of the movable member by forming the three magnetic generating portions and the three magnetic detection elements is described. In contrast, in other embodiments of the present invention, the number of the magnetic generating portions and that of the magnetic detection elements may be one, two, or four or more. The detection accuracy and the detection reliability of the position of the movable member can be improved by increasing the number of the magnetic detection elements. In contrast, the manufacturing cost of the range detection device can be reduced by decreasing the number of the magnetic detection elements.

Furthermore, in the above embodiments, a part of the movable member is magnetized so that the part is used as the magnetic generating portions. In contrast, in other embodiments of the present invention, a permanent magnet as the magnetic generating portion may be embedded in a movable member made of resin, for example.

Moreover, in other embodiments of the present invention, electronic components such as a capacitor for protecting the magnetic detection element from a surge voltage and a resistor for preventing external noise from mixing into the magnetic detection element, may be installed to the substrate.

In other embodiments of the present invention, the range detection device may not be placed in the automatic transmission in the state of oil immersion.

Furthermore, in other embodiments of the present invention, the range detection device may be applied to an automatic transmission which changes a gear position by a switching portion other than the hydraulic switching valve.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A range detection device attached to a control device that changes a gear position of an automatic transmission by a switching portion and configured to detect which range is selected in the gear position, the range detection device comprising:
 a movable member including a magnetic generating portion, the movable member being capable of moving with the switching portion;
 a supporting member including a plate portion having a surface that is opposed to the magnetic generating portion of the movable member, and a recess formed in a surface of the plate portion which is opposite from the movable member, the supporting member supporting the movable member such that the movable member is capable of moving parallel with the plate portion;

a substrate placed in the recess substantially parallel with the plate portion and having a first hole that communicates between a surface of the substrate adjacent to the plate portion and an opposite surface of the substrate from the plate portion;

a magnetic detection element installed to the surface of the substrate adjacent to the plate portion so as to correspond to a position of the first hole, the magnetic detection element being capable of detecting magnetism of the magnetic generating portion; and a sealing member filled in the recess and covering the substrate and the magnetic detection element.

2. The range detection device according to claim 1, wherein the substrate has a second hole that communicates between the surface of the substrate adjacent to the plate portion and the opposite surface of the substrate from the plate portion, and a position of the second hole is different from the position of the first hole.

3. The range detection device according to claim 1, wherein the magnetic detection element is installed to the substrate with a gap of a predetermined width from the substrate.

4. The range detection device according to claim 1, wherein an opening portion of the first hole has a substantially circular shape, and a diameter of the opening portion is in a range of 0.7 mm to 1.7 mm.

5. The range detection device according to claim 1, wherein an opening portion of the first hole has a substantially rectangular shape, and a width of the opening portion in a longitudinal direction is larger than a width of the magnetic detection element in a longitudinal direction.

* * * * *